United States Patent
Kim et al.

(10) Patent No.: US 8,649,390 B2
(45) Date of Patent: Feb. 11, 2014

(54) METHOD AND APPARATUS FOR ALLOCATING RESOURCE IN WIRELESS NETWORK USING DIRECTIONAL ANTENNA

(75) Inventors: Yong Sun Kim, Gyeryong (KR); Woo Yong Lee, Daejeon (KR); Meejoung Kim, Seoul (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 661 days.

(21) Appl. No.: 12/899,459

(22) Filed: Oct. 6, 2010

(65) Prior Publication Data

US 2011/0117945 A1    May 19, 2011

(30) Foreign Application Priority Data

Nov. 13, 2009    (KR) .................. 10-2009-0109492

(51) Int. Cl.
*H04L 12/28*    (2006.01)
(52) U.S. Cl.
USPC .......................................... 370/431

(58) Field of Classification Search
None
See application file for complete search history.

(56) References Cited

U.S. PATENT DOCUMENTS

2007/0064720 A1*    3/2007    Sterenson et al. ............ 370/445
2010/0272218 A1*    10/2010    Yeh et al. ...................... 375/330

FOREIGN PATENT DOCUMENTS

KR    10-2008-0013241 A    2/2008

* cited by examiner

*Primary Examiner* — Kibrom T Hailu

(57) ABSTRACT

A method and apparatus for allocating a resource in a wireless network using a directional antenna is provided. The method and apparatus for allocating a resource in a wireless network using a directional antenna may spatially reuse resources using the directional antenna, allocate resources to enable a maximum number of groups to be transmitted in a given time or to enable a group including a number of links to be transmitted first, and thereby may reduce communication delay and increase throughput.

21 Claims, 4 Drawing Sheets

MIMCT

MAMCT

METHOD AND APPARATUS FOR ALLOCATING RESOURCE IN WIRELESS NETWORK USING DIRECTIONAL ANTENNA

CROSS-REFERENCE TO RELATED APPLICATION

This application claims priority from Korean Patent Application No. 10-2009-0109492, filed on Nov. 13, 2009, in the Korean Intellectual Property Office, the entire disclosure of which is incorporated herein by reference.

BACKGROUND OF THE INVENTION

1. Field of the Invention

The present invention relates to a method and apparatus for allocating a resource in a wireless network using a directional antenna, and more particularly, to a method and apparatus for allocating a resource in a wireless network using a directional antenna that may spatially reuse resources using the directional antenna, and thereby may reduce a communication delay and increase throughput.

2. Description of Related Art

Currently, a millimeter wave band (57 GHz through 66 GHz) is the focus of attention after being assigned as an unlicensed frequency band to overcome a shortage of frequency resources. A millimeter wave may have properties such as a short wavelength, high frequency, having a broadband width, being susceptible to atmosphere, and the like. Such properties may have advantages and disadvantages. For example, 60 GHz frequency bands may have a high data rate using an ultra wideband, and also have advantages such as robustness against interferences due to high linearity, superior security, easy reuse of frequency, and the like. Also, since 60 GHz frequency bands may have a short wavelength, a variety of used components may be compact and light weight. However, 60 GHz frequency bands may have a short radio range due to absorption by oxygen molecules and attenuation due to rain, and require a predetermined line of sight distance. A directional antenna having a high gain in a physical layer may be regarded as overcoming the above-described disadvantages. A directional antenna may radiate transmission energy in only a desired direction. Accordingly, a radio range may be extended, and a high gain may be obtained. Also, since the use of a narrow antenna beam enables a space to be reused, a plurality of users in the same region may simultaneously perform communication, and a data amount may increase.

The use of millimeter wave band may increase due to the increase in wireless applications requiring a high transmission rate. Also, a significance of an efficient use of resources using a directional antenna may increase.

Much research on a millimeter wave band using a directional antenna has been conducted. In particular, a resource allocation in a Wireless Personal Area Networks (WPANs) in a Medium Access Control (MAC) has been a subject of interest. When data amount to be processed is not significant, a particular resource allocation scheduling may not be required. However, considering that a data amount is ever increasing, a resource allocation is desired.

SUMMARY OF THE INVENTION

An aspect of the present invention provides a method and apparatus for allocating a resource in a wireless network using a directional antenna.

Another aspect of the present invention also provides a method and apparatus for allocating a resource in a wireless network using a directional antenna that may spatially reuse resources using the directional antenna, and thereby may reduce a communication delay and increase an efficiency of resource use.

Another aspect of the present invention also provides a method and apparatus for allocating a resource that may spatially reuse resources using a directional antenna, and thereby may reduce a communication delay and increase throughput.

According to an aspect of the present invention, there is provided a method of allocating a resource in a wireless network using a directional antenna, the method including: confirming a number of transmitting/receiving (Tx/Rx) links; dividing the Tx/Rx links into a plurality of groups based on a determination with respect to an exclusive region; and confirming a transmission time of each of the plurality of groups, and scheduling a channel time to be equal to the transmission time being allocated to each of the plurality of groups in an order of shortest transmission time.

According to another aspect of the present invention, there is provided a method of allocating a resource in a wireless network using a directional antenna, the method including: confirming a number of Tx/Rx links; dividing the Tx/Rx links into a plurality of groups based on a determination with respect to an exclusive region; and confirming a number of links included in each of the plurality of groups, and scheduling a channel time to be allocated to each of the plurality of groups in an order from a group including a greater number of links.

According to an aspect of the present invention, there is provided an apparatus for allocating a resource in a wireless network using a directional antenna, the apparatus including: a link confirmation unit to confirm a number of Tx/Rx links; a group division unit to divide the Tx/Rx links into a plurality of groups based on a determination with respect to an exclusive region; and a scheduling unit to confirm a transmission time of each of the plurality of groups, and to allocate a channel time to be equal to the transmission time to each of the plurality of groups in an order of shortest transmission time.

According to another aspect of the present invention, there is provided an apparatus for allocating a resource in a wireless network using a directional antenna, the apparatus including: a link confirmation unit to confirm a number of Tx/Rx links; a group division unit to divide the Tx/Rx links into a plurality of groups based on a determination with respect to an exclusive region; and a scheduling unit to confirm a number of links included in each of the plurality of groups, and to allocate a channel time to each of the plurality of groups in an order from a group including a greater number of links.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
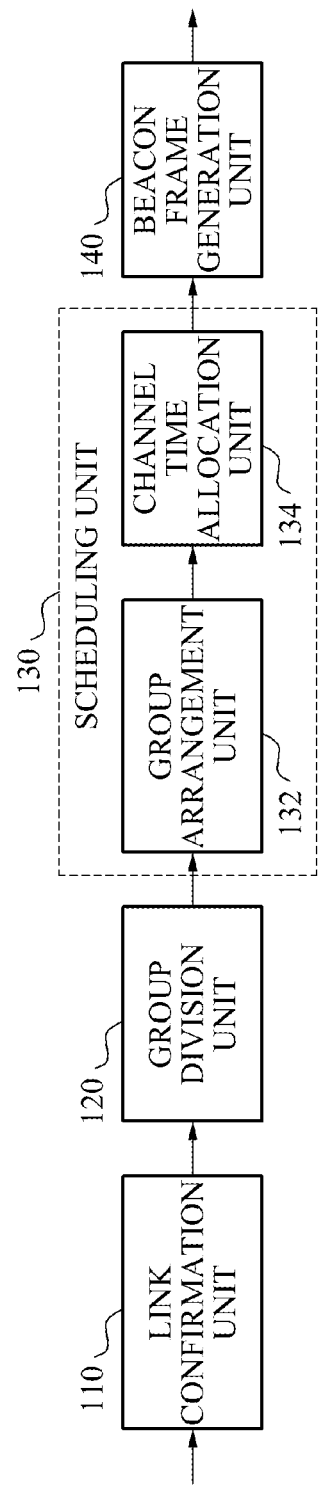
FIG. 1 is a block diagram illustrating a configuration of an apparatus for allocating a resource in a wireless network using a directional antenna according to an embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

According to an embodiment of the present invention, a method and apparatus for allocating a resource in a wireless network using a directional antenna may spatially reuse resources using the directional antenna, and thereby may reduce a communication delay and increase throughput.

FIG. 1 is a block diagram illustrating a configuration of an apparatus for allocating a resource in a wireless network using a directional antenna according to an embodiment of the present invention. Referring to FIG. 1, the apparatus for allocating a resource in a wireless network using a directional antenna, hereinafter, referred to as a resource allocation apparatus, may include a link confirmation unit 110, a group division unit 120, a scheduling unit 130, and a beacon frame generation unit 140.

The link confirmation unit 110 may confirm a number of transmitting/receiving (Tx/Rx) links. In this instance, information about the Tx/Rx links and the number of Tx/Rx links may be ascertained through a Neighbor Discovery (ND) process.

The group division unit 120 may divide the Tx/Rx links into a plurality of groups based on a standard for determining an exclusive region of the directional antenna. The directional antenna is not illustrated in FIG. 1. The exclusive region may indicate a region around a receiver in a link that may perform communication without an effect of a transmitter of another link.

The scheduling unit 130 may allocate a channel time to the plurality of groups based on a MinMax Concurrent Transmission scheduling algorithm (MIMCT) or a MaxMin Concurrent Transmission scheduling algorithm (MAMCT). Allocating of the channel time may be referred to as a Channel Time Allocation (CTA). Here, the MIMCT algorithm may allocate resources to enable a maximum number of groups to be transmitted in a given time. The MAMCT algorithm may allocate resources to enable a group including a greater number of links to be transmitted first. The scheduling unit 130 may include a group arrangement unit 132 and a channel time allocation unit 134.

The group arrangement unit 132 may arrange groups based on the MIMCT or MAMCT algorithm.

When the MIMCT algorithm is used, the group arrangement unit 132 may confirm max links having a longest transmission time for each of the plurality of groups, and arrange the plurality of groups including the max links, in an order of shortest transmission time of the max links. In this instance, when groups including max links having a same transmission time exist, the group arrangement unit 132 may arrange the groups in an order from a group including a greater number of links included in each of the groups.

When the MAMCT algorithm is used, the group arrangement unit 132 may confirm max links having a longest transmission time for each of the plurality of groups, confirm a number of links included in each of the plurality of groups, and arrange the groups in an order from a group including a greater number of links. In this instance, when groups having a same number of links exist, the group arrangement unit 132 may arrange the groups in an order from a group having a shortest transmission time of the max links included in each of the groups having the same number of links.

The channel time allocation unit 134 may allocate the channel time to a maximum number of groups in a reservation period of a superframe in the arrangement order determined by the group arrangement unit 132.

Also, when a remaining region where the channel time may be allocated exists in the superframe after allocating the channel time, the channel time allocation unit 134 may determine whether a group, including at least one link having a transmission time less than the channel time of the remaining region, exists in the groups where the channel time is not allocated, in the arrangement order. Also, when it is determined that the group including the at least one link having the transmission time less than the channel time of the remaining region exists, the channel time allocation unit 134 may allocate the channel time to each of the at least one link having the transmission time less than the channel time of the remaining region from among links included in the group using the remaining region.

The beacon frame generation unit 140 may generate a beacon frame including information about a start time and duration of the channel time allocated to each of the groups.

Hereinafter, a method, referred to as a resource allocation method, of allocating a resource in a wireless network using a directional antenna is described in detail.

Figure 2:
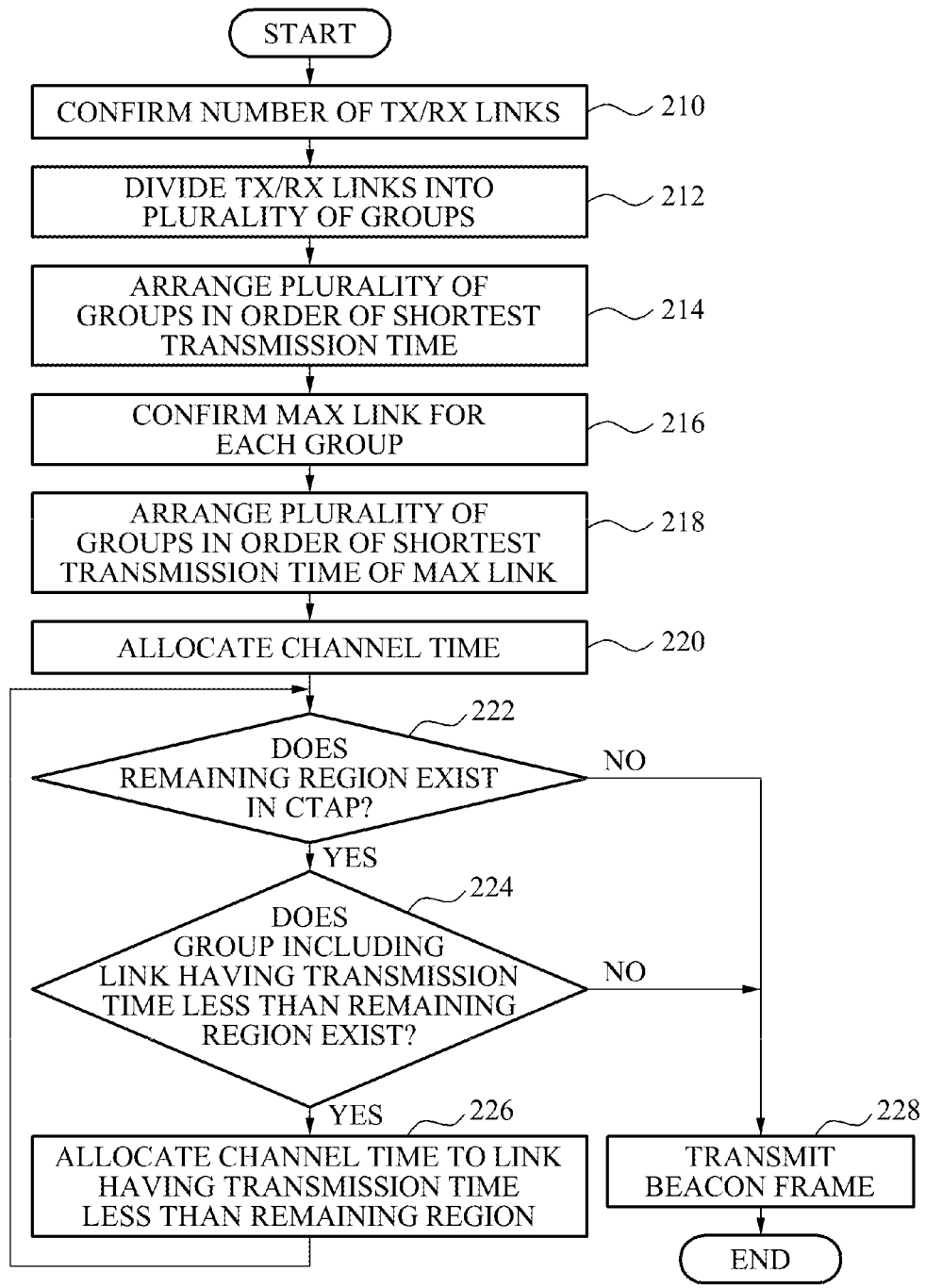
FIG. 2 is a flowchart illustrating a method of allocating a resource in a wireless network using a directional antenna according to an embodiment of the present invention.

FIG. 2 is a flowchart illustrating a resource allocation method according to an embodiment of the present invention. FIG. 2 illustrates a scheduling operation in a single superframe, and a resource allocation apparatus may be based on an MIMCT that allocates resources to enable a maximum number of groups to be transmitted in a given time.

In operation 210, the resource allocation apparatus may confirm a number of transmitting/receiving (Tx/Rx) links. In this instance, the number of Tx/Rx links may include a number of links where a channel time is not allocated in a previous superframe, and a number of links newly generated in the previous superframe.

In operation 212, the resource allocation apparatus may divide the Tx/Rx links into a plurality of groups based on a determination with respect to an exclusive region. In operation 214, the resource allocation apparatus may arrange the Tx/Rx links in an order of shortest transmission time.

In operation 216, the resource allocation apparatus may confirm max links having a longest transmission time for each of the plurality of groups. Here, the max links having a longest transmission time may be required, since links included in each of the plurality of groups are simultaneously transmitted and a sufficient amount of time to complete the transmission is required.

In operation 218, the resource allocation apparatus may arrange the plurality of groups including the max links in an order of shortest transmission time of the max links. When groups including max links having a same transmission time exist, the resource allocation apparatus may arrange the groups in an order from a group including a greater number of links included in each of the groups in operation 218.

In operation 220, the resource allocation apparatus may allocate the channel time to a maximum number of groups where the channel time is not allocated, in the arrangement order.

In operation 222, the resource allocation apparatus may determine whether a remaining region where the channel time may be allocated exists in a Channel Time Allocation Period (CTAP) of a superframe. When it is determined that the remaining region exists as a result of the determining in operation 222, the resource allocation apparatus may determine whether a group, including at least one link having a transmission time less than the channel time of the remaining region, exists in the groups where the channel time is not allocated, in the arrangement order in operation 224.

When it is determined that the group including the at least one link having the transmission time less than the channel time of the remaining region exists in operation 224, the resource allocation apparatus may allocate the channel time to each of the at least one link having the transmission time less than the channel time of the remaining region, using the remaining region in operation 226. Sequentially, the resource allocation apparatus may return to operation 222.

When it is determined that the remaining region does not exist in operation 222 or it is determined that the group including the at least one link having the transmission time less than the channel time of the remaining region does not exist in operation 224, the resource allocation apparatus may transmit a beacon frame including information about a start time or duration of the channel time allocated to each of the plurality of groups in operation 228.

Figure 3:
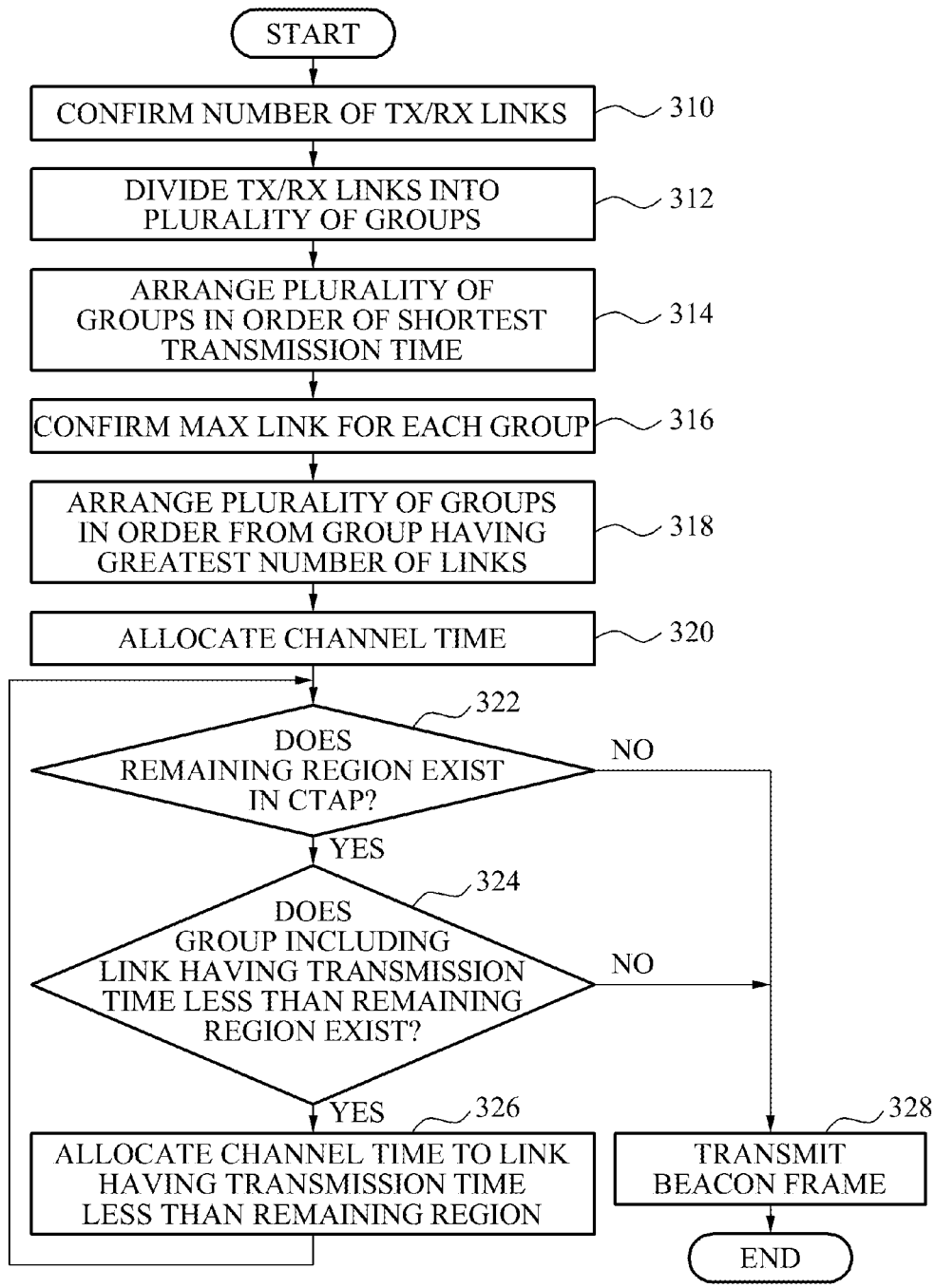
FIG. 3 is a flowchart illustrating a method of allocating a resource in a wireless network using a directional antenna according to another embodiment of the present invention.

FIG. 3 is a flowchart illustrating a resource allocation method according to another embodiment of the present invention. FIG. 3 illustrates a scheduling operation in a single superframe, and a resource allocation apparatus may be based on an MAMCT that allocates resources to enable a group including a greater number of links to be transmitted first.

In operation 310, the resource allocation apparatus may confirm a number of Tx/Rx links. In this instance, the number of Tx/Rx links may include a number of links that a channel time is not allocated in a previous superframe, and a number of links newly generated in the previous superframe.

In operation 312, the resource allocation apparatus may divide the Tx/Rx links into a plurality of groups based on a determination with respect to an exclusive region. In operation 314, the resource allocation apparatus may arrange the Tx/Rx links in an order of shortest transmission time.

In operation 316, the resource allocation apparatus may confirm max links having a longest transmission time for each of the plurality of groups. Here, the max links having a longest transmission time may be required, since links included in each of the plurality of groups are simultaneously transmitted and a sufficient amount of time to complete the transmission is required.

In operation 318, the resource allocation apparatus may confirm a number of links included in each of the plurality of groups, and arrange the plurality of groups in an order from a group including a greater number of links. When groups having a same number of links exist, the resource allocation apparatus may arrange the groups in an order from a group having a shortest transmission time of the max links included in each of the groups having the same number of links in operation 318.

In operation 320, the resource allocation apparatus may allocate the channel time to a maximum number of groups where the channel time is not allocated, in the arrangement order.

In operation 322, the resource allocation apparatus may determine whether a remaining region where the channel time may be allocated exists in a CTAP of a superframe. When it is determined that the remaining region exists as a result of the determining in operation 322, the resource allocation apparatus may determine whether a group, including at least one link having a transmission time less than the channel time of the remaining region, exists in the groups where the channel time is not allocated, in the arrangement order in operation 324.

When it is determined that the group including the at least one link having the transmission time less than the channel time of the remaining region exists in operation 324, the resource allocation apparatus may allocate the channel time to each of the at least one link having the transmission time less than the channel time of the remaining region, using the remaining region in operation 326. Sequentially, the resource allocation apparatus may return to operation 322.

When it is determined that the remaining region does not exist in operation 322 or it is determine that the group including the at least one link having the transmission time less than the channel time of the remaining region does not exist in operation 324, the resource allocation apparatus may transmit a beacon frame including information about a start time or duration of the channel time allocated to each of the plurality of groups in operation 328.

Figure 4A:
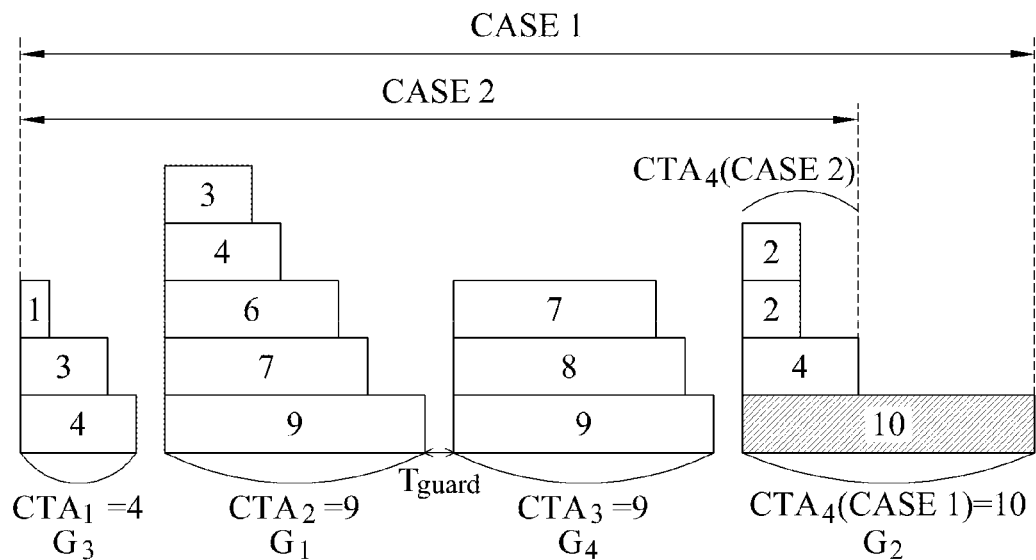
FIGS. 4A and 4B are diagrams illustrating examples of two types of resource allocations according to embodiments of the present invention.
Figure 4B:
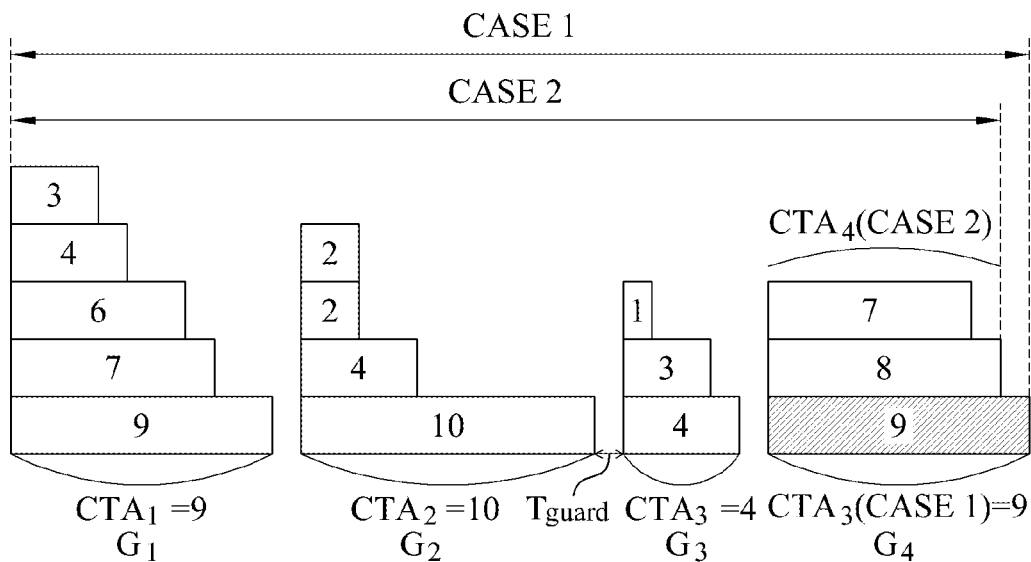

FIGS. 4A and 4B are diagrams illustrating examples of two types of resource allocations according to embodiments of the present invention. FIGS. 4A and 4B illustrates an example to describe MIMCT and MAMCT algorithms.

FIG. 4A illustrates an example of an MIMCT algorithm, and FIG. 4B illustrates an example of an MAMCT algorithm.

Referring to FIGS. 4A and 4B, it may be assumed that a number of links requiring resources is 15, and 15 links are divided into four groups based on a determination with respect to an exclusive region.

$G_1=\{3,4,5,7,9\}$, $G_2=\{2,2,4,10\}$, $G_3=\{1,3,4\}$, $G_4=\{7,8,9\}$

It may be assumed that a data rate (R) is 1.

In the MIMCT algorithm, the groups may be arranged in an order of shortest transmission time, as below.

$G_3$, $G_1$, $G_4$, $G_2$

In this instance, since a transmission time of each of the $G_1$ and $G_4$ is identical, $G_1$ may be arranged first since $G_1$ has a greater number of links. When a time resource is allocated in the arrangement order as described above, transmission may be performed in the order illustrated in FIG. 4A. In FIG. 4A, a number designated in each block may indicate data amount depending on a link.

In the MAMCT algorithm, the groups may be arranged in an order from a group including a greater number of links, as below.

$G_1$, $G_2$, $G_3$, $G_4$

In this instance, since a number of links included in each of the $G_3$ and $G_4$ is equal, $G_3$ may be arranged first since $G_3$ has a shorter transmission time. When a time resource is allocated in the arrangement order as described above, transmission may be performed in the order illustrated in FIG. 4B. In FIG. 4A, a number designated in each block may indicate data amount depending on a link.

Also, it is illustrated a case (1) indicating when a length of a time resource allocation period is sufficient and a case (2) indicating when a length of a time resource allocation period is insufficient, in FIGS. 4A and 4B.

In the case (1), load included in all the groups may be transmitted. However, in the case (2), since the MIMCT and the MAMCT length of the time resource allocation period of the MIMCT and the MAMCT are insufficient, links included in the first three groups may be transmitted and links included in the last group may not be transmitted. Blocks in shaded portion indicate the links that may not be transmitted.

The method of allocating a resource in a wireless network using a directional antenna according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of allocating a resource in a wireless network using a directional antenna, the method comprising:
   confirming a number of transmitting/receiving (Tx/Rx) links;
   grouping the Tx/Rx links into a plurality of groups based on a standard for determining an exclusive region of the directional antenna, each group including at least one Tx/Rx link; and
   confirming a transmission time of each of the plurality of groups, and allocating a channel time to each of the plurality of groups, which is arranged in an order of a group having a shortest transmission time to a group having a longest transmission time.

2. The method of claim 1, wherein the allocating comprises:
   confirming a max link having a longest transmission time in each of the plurality of groups;
   arranging the plurality of groups in an arrangement order of a shortest transmission time to a longest transmission time of the max links of the plurality of groups; and
   assigning a channel time to each of a maximum number of groups where a channel time is not allocated among the plurality of groups, according to the arrangement order, the maximum number of groups being groups to which a superframe can allocate a channel time.

3. The method of claim 2, wherein, if there are, among the plurality of groups, groups including max links that have the same transmission time, the arranging comprises arranging said groups in an order from a group including a greater number of links to a group including a smaller number of links.

4. The method of claim 2, wherein, when assigning the channel time to the groups where the channel time is not allocated, links included in each of the groups where the channel time is not allocated are arranged in an order of a shortest transmission time to a longest transmission time of the links, and a channel time is allocated to the links in the arrangement order of the links.

5. The method of claim 2, wherein, if there is a remaining region in the superframe after allocating the channel time, the allocating further comprises:
   determining whether or not a group, which includes at least one link having a transmission time less than a size of the remaining region, exists in the groups where the channel time is not allocated, sequentially based on the arrangement order; and
   if it is determined that the group including the at least one link having the transmission time less than the size of the remaining region exists, allocating a channel time to each of the at least one link using the remaining region.

6. A method of allocating a resource in a wireless network using a directional antenna, the method comprising:
   confirming a number of Tx/Rx links;
   grouping the Tx/Rx links into a plurality of groups based on a standard for determining an exclusive region of the directional antenna, each group including at least one Tx/Rx link; and
   confirming a number of links included in each of the plurality of groups, and allocating a channel time to each of the plurality of groups, which is arranged in an arrangement order from a group including a greater number of links to a group including a smaller number of links.

7. The method of claim 6, wherein the allocating comprises:
   confirming the number of links included in each of the plurality of groups, and arranging the plurality of groups in the arrangement order; and
   assigning a channel time to each of a maximum number of groups where a channel time is not allocated among the plurality of groups, according to the arrangement order, the maximum number of groups being groups to which a superframe can allocate a channel time.

8. The method of claim 7, wherein the arranging of the plurality of groups comprises:
   confirming a max link having a longest transmission time among links included in each of the plurality of groups; and
   if there are, among the plurality of groups, groups including the same number of links, arranging said groups in an order from a group having a shortest transmission time of a max link to a group having a longest transmission time of a max link.

9. The method of claim 7, wherein, when assigning the channel time to the groups where the channel time is not allocated, links included in each of the groups where the channel time is not allocated are arranged in an order of a shortest transmission time to a longest transmission time of the links, and a channel time is allocated to the links in the arrangement order of the links.

10. The method of claim 7, wherein, if there is a remaining region in the superframe after allocating the channel time, the allocating further comprises:
   determining whether or not a group, which includes at least one link having a transmission time less than a size of the remaining region, exists in the groups where the channel time is not allocated, sequentially based on the arrangement order; and
   if it is determined that the group including the at least one link having the transmission time less than the size of the remaining region exists, allocating a channel time to each of the at least one link using the remaining region.

11. An apparatus for allocating a resource in a wireless network using a directional antenna, the apparatus comprising:
- a link confirmation unit configured to confirm a number of Tx/Rx links;
- a group division unit configured to group the Tx/Rx links into a plurality of groups based on a standard for determining an exclusive region of the directional antenna, each group including at least one Tx/Rx link; and
- a scheduling unit configured to confirm a transmission time of each of the plurality of groups, and to allocate a channel time to each of the plurality of groups, which is arranged in an order of a group having a shortest transmission time to a group having a longest transmission time.

12. The apparatus of claim 11, wherein the scheduling unit comprises:
- a group arrangement unit configured to confirm a max link having a longest transmission time in each of the plurality of groups, and to arrange the plurality of groups including the max links in an arrangement order of a shortest transmission time to a longest transmission time of the max links of the plurality of groups; and
- a channel time allocation unit configured to allocate a channel time to each of a maximum number of groups where a channel time is not allocated, according to the arrangement order, the maximum number of groups being groups to which a superframe can allocate a channel time.

13. The apparatus of claim 12, wherein, if there are, among the plurality of groups, groups including max links that have the same transmission time, the group arrangement unit arranges said groups in an order from a group including a greater number of links to a group including a smaller number of links.

14. The apparatus of claim 12, wherein, when allocating the channel time to the groups where the channel time is not allocated, the channel time allocation unit arranges links included in each of the groups where the channel time is not allocated in an order of a shortest transmission time to a longest transmission time of the links, and allocates a channel time to the links in the arrangement order of the links.

15. The apparatus of claim 12, wherein, if there is a remaining region in the superframe after allocating the channel time, the channel time allocation unit determines whether or not a group, which includes at least one link having a transmission time less than a size of the remaining region, exists in the groups where the channel time is not allocated, sequentially based on the arrangement order, and if it is determined that the group including the at least one link having the transmission time less than the size of the remaining region exists, the channel time allocation unit allocates a channel time to each of the at least one link using the remaining region.

16. An apparatus for allocating a resource in a wireless network using a directional antenna, the apparatus comprising:
- a link confirmation unit configured to confirm a number of Tx/Rx links;
- a group division unit configured to group the Tx/Rx links into a plurality of groups based on a standard for determining an exclusive region of the directional antenna, each group including at least one Tx/Rx link; and
- a scheduling unit configured to confirm a number of links included in each of the plurality of groups, and to allocate a channel time to each of the plurality of groups in an arrangement order from a group including a greater number of links to a group including a smaller number of links.

17. The apparatus of claim 16, wherein the scheduling unit comprises:
- a group arrangement unit configured to confirm the number of links included in each of the plurality of groups, and to arrange the plurality of groups in the arrangement order; and
- a channel time allocation unit configured to allocate a channel time to each of a maximum number of groups where a channel time is not allocated among the plurality of groups, according to the arrangement order, the maximum number of groups being groups to which a superframe can allocate a channel time.

18. The apparatus of claim 17, wherein the group arrangement unit confirms a max link having a longest transmission time among links included in each of the plurality of groups, and if there are, among the plurality of groups, groups including the same number of links, the group arrangement unit arranges said groups in an order from a group having a shortest transmission time of a max link to a group having a longest transmission time of a max link.

19. The apparatus of claim 17, wherein, when allocating the channel time to the groups where the channel time is not allocated, the channel time allocation unit arranges links included in each of the groups where the channel time is not allocated in an order of a shortest transmission time to a longest transmission time of the links, and allocates the channel time to the links in the arrangement order of the links.

20. The apparatus of claim 17, wherein, if there is a remaining region in the superframe after allocating the channel time, the channel time allocation unit determines whether or not a group, which includes at least one link having a transmission time less than a size of the remaining region, exists in the groups where the channel time is not allocated, sequentially based on the arrangement order, and
- if it is determined that the group including the at least one link having the transmission time less than the size of the remaining region exists, the channel time allocation unit allocates a channel time to each of the at least one link using the remaining region.

21. The method of claim 1, wherein links included in each of the plurality of groups are simultaneously transmitted.

* * * * *